United States Patent Office 2,898,286
Patented Aug. 4, 1959

2,898,286

METHOD OF REDUCING CORROSIVENESS OF LUBRICATING OILS BY HYDROGENATION

Milton P. Kleinholz, Homewood, Ill., assignor to Sinclair Refining Company, New York, N.Y., a corporation of Maine No Drawing. Application August 4, 1955
Serial No. 526,546

1 Claim. (Cl. 208—264)

My invention relates to aircraft lubrication and, in particular, relates to an improved method for producing non-additive lubricating oil compositions which are especially useful for the lubrication of aircraft engines.

Of the problems of lubricating oil performance, one peculiar to the aircraft field is that failure to lubricate properly in service cannot be tolerated. Hence, special tests have been established by some engine manufacturers as a control on permissible limits of certain properties of the lubricating compositions employed in an effort to insure the necessary performance. One such test is known as the MacCoull-Ryder oxidation corrosion test (see SAE Journal, August 1942) and specifications of at least one engine manufacturer indicate that engine lubricating oil compositions showing corrosion of greater than 500 milligrams (lead loss of lead coated steel bearing) by this test should be carefully watched. Frequently, in manufacturing a saleable product the lead loss must be less than 50 milligrams. Of course, compositions requiring special precautions or which need to be tested frequently increase maintenance cost and this can militate against their use.

I have now discovered an improved method whereby aircraft engine non-additive lubricating oil compositions can be produced which are characterized by a low corrosion indication by the MacCoull-Ryder test. This method involves subjecting the lubricating oil composition to the action of hydrogen while the composition and the hydrogen are in contact with a cobalt-molybdate supported on alumina catalyst. The operating conditions are important, and I employ a reaction temperature of about 500 to 550° F., a pressure of about 400 to 600 p.s.i.g. and a weight hourly space velocity (weight units of oil per hour per weight unit of catalyst) of about 3 to 7. The use of reaction temperatures which vary very much above or below the stated range does not produce the desired result.

The following example illustrates various embodiments which fall within, as well as without, the scope of my invention.

EXAMPLE

The charge stock was a blend of 40 percent by volume of uncontacted neutral oil which had been produced by conventionally phenol extracting and methylethyl ketone dewaxing of a Mid-Continent heavy neutral lube distillate and 60 percent by volume of an uncontacted bright stock which had been produced by conventionally propane deasphalting, phenol extracting and methylethyl ketone dewaxing of a Mid-Continent lube residuum. The neutral oil and the bright stock both had a viscosity index of about 95 with approximate viscosities of 62 SUS/210° F. for the neutral oil and 155 SUS/210° F. for the bright stock.

The catalyst used in this work was a 1/8-inch pelleted catalyst comprising cobalt molybdate supported on alumina having the following analysis: cobalt oxide, 2.88 weight percent; molybdic oxide, 10.3 weight percent; silica, 5.2 weight percent; and the balance alumina. This catalyst, before use in the treatment of the blend in the presence of hydrogen, was pretreated for two hours with hydrogen at 700° F. and atmospheric pressure followed by pretreatment with hydrogen sulfide at 700° F. and atmospheric pressure for two hours. After the catalyst had thus been pretreated with hydrogen and hydrogen sulfide, it was employed in the processing of the blend in the presence of hydrogen using downflow for both the oil feed and the hydrogen through a fixed bed of the catalyst. Lube oil products from the reactor were given a light steam stripping in order to remove dissolved hydrogen sulfide and traces of cracked material before undergoing complete testing. The results of the tests conducted, including further information concerning the reaction conditions wherein the blend, hydrogen and catalyst were contacted, are set forth in the accompanying table.

*Table*

| | Charge Blend | Hydrofinished Product No. 1 | Hydrofinished Product No. 2 | Hydrofinished Product No. 3 | Hydrofinished Product No. 4 | Hydrofinished Product No. 5 | Hydrofinished Product No. 6 | Hydrofinished Product No. 7 | Hydrofinished Product No. 8 |
|---|---|---|---|---|---|---|---|---|---|
| Process Conditions: | | | | | | | | | |
| Temperature, °F | | 350 | 400 | 425 | 450 | 500 | 500 | 550 | 600 |
| Pressure, p.s.i.g. | | 500 | 500 | 500 | 500 | 500 | 500 | 500 | 500 |
| Space Velocity, WHSV | | 5 | 5 | 5 | 5 | 5 | 5 | 5 | 5 |
| Hydrogen Recycle, s.c.f./b | | 1,500 | 1,500 | 1,500 | 1,500 | 1,500 | 1,500 | 1,500 | 1,500 |
| Laboratory Tests: | | | | | | | | | |
| Gravity, °API | 27.6 | 27.7 | 27.6 | 27.9 | 27.8 | 27.7 | 27.7 | 27.7 | 27.7 |
| Flash, °F | 525 | 530 | | 520 | | | | | |
| Fire, °F | 600 | 605 | | 605 | | | | | |
| Viscosity, SUS at 100° F | 1,380 | 1,386 | 1,385 | 1,324 | 1,376 | 1,380 | 1,366 | 1,362 | |
| Viscosity, SUS at 210° F | 104.0 | 104.3 | 104.2 | 101.7 | 104.1 | 104.0 | 103.8 | 103.6 | |
| Viscosity Index | 93.4 | 93.4 | 93.4 | 93.4 | 93.5 | 93.4 | 93.9 | 93.7 | |
| Pour, °F | 5 | 5 | 5 | 10 | | 5 | | 5 | |
| Color, NPA | 5+ | 5— | 5— | 4½— | 5— | 5— | 5— | 5— | 5— |
| Carbon Residue (Con), Percent | 0.380 | 0.324 | 0.391 | 0.289 | 0.385 | 0.370 | | | |
| Specific Dispersion | 113.5 | 113.3 | | 114.3 | | | 112.7 | 113.2 | 113.8 |
| Iodine Number | 14.6 | 14.2 | 12.5 | | 13.4 | 13.6 | 16.5 | 12.8 | 14.3 |
| Sulfur, Percent | 0.23 | 0.23 | 0.22 | 0.21 | 0.21 | 0.20 | 0.20 | 0.19 | 0.17 |
| MacCoull-Ryder Test: | | | | | | | | | |
| Lead Bearing Loss, mgs.— | | | | | | | | | |
| Individual Tests | 758, 790, 856 | 747, 755, 831 | 28.4, 313, 476 | 397, 397, 524 | 719, 766, 786 | 0.2, 0.8, 14.3 | 0.0, 1.7, 26.6 | 0.0, 0.0, 0.1 | 864, 879, 881 |
| Average | 801 | 778 | 272 | 439 | 758 | 5.1 | 7.1 | 0.0 | 875 |
| Bearing Loss Rating | Unsatisfactory | Unsatisfactory | Unsatisfactory | Unsatisfactory | Unsatisfactory | Satisfactory | Satisfactory | Satisfactory | Unsatisfactory |
| Viscosity Rise of Oxidized Oil, SUS/210° F. (Avg.) | | 132 | 133 | 43 | | 141 | 4.1 | 6.0 | 2.0 | 166 |
| Acid Number of Oxidized Oil (Avg.) | | 14.4 | 17.9 | 7.9 | | 16.4 | 0.99 | 0.99 | 0.92 | 18.3 |

Referring to the table it will be noted that processing at 350° F., 400° F., 425° F. and 450° F. yielded products with high MacCoull-Ryder lead bearing losses (272 to 778 mg.). However, duplicate runs at 500° F. yielded products with very low lead losses (5 to 7 mg.) and the products from the 550° F. run tested zero loss. Upon raising the temperature to 600° F., the MacCoull-Ryder loss again became high (875 mg.). Thus, the products from the 500° and 550° runs had excellent MacCoull-Ryder properties.

I claim:

A method for the manufacture of non-additive aircraft piston engine lubricating oil of low corrosiveness when tested by the MacCoull-Ryder oxidation corrosion test which comprises reacting a mineral lubricating oil and hydrogen while in contact with a cobalt molybdate supported on alumina catalyst at a temperature of about 500 to 550° F., a pressure of about 400 to 600 p.s.i.g. and a weight hourly space velocity of about 3 to 7.

References Cited in the file of this patent

UNITED STATES PATENTS

| | | |
|---|---|---|
| 2,577,823 | Stine | Dec. 11, 1951 |
| 2,706,167 | Harper et al. | Apr. 12, 1955 |